(12) United States Patent
Marioni

(10) Patent No.: US 7,262,576 B2
(45) Date of Patent: Aug. 28, 2007

(54) METHOD FOR DRIVING A SYNCHRONOUS ELECTRIC MOTOR IN PARTICULAR FOR FANS

(75) Inventor: Elio Marioni, Dueville (IT)

(73) Assignee: Askoll Holding S.r.l., Povolaro di Dueville (IT)

( * ) Notice: Subject to any disclaimer, the term of this patent is extended or adjusted under 35 U.S.C. 154(b) by 0 days.

(21) Appl. No.: 11/172,374

(22) Filed: Jun. 30, 2005

(65) Prior Publication Data
US 2006/0033465 A1 Feb. 16, 2006

(30) Foreign Application Priority Data
Jun. 30, 2004 (EP) .................................. 04425483

(51) Int. Cl.
*H02P 1/46* (2006.01)
(52) U.S. Cl. .............. 318/717; 318/138; 318/439; 318/700; 318/715; 318/254
(58) Field of Classification Search .......... 318/138, 318/254, 439, 474, 700–811, 432–434
See application file for complete search history.

(56) References Cited

U.S. PATENT DOCUMENTS

| 4,511,834 A | 4/1985 | Studtmann ............... 318/700 |
| 4,740,738 A | 4/1988 | El-Antably et al. ......... 318/701 |
| 5,006,774 A | 4/1991 | Rees .......................... 318/721 |
| 6,741,049 B2 * | 5/2004 | Kawaji et al. ............. 318/254 |

FOREIGN PATENT DOCUMENTS

| EP | 0403806 A1 | 12/1990 |
| EP | 0702451 A1 | 3/1996 |
| EP | 1512949 A1 | 3/2005 |

* cited by examiner

*Primary Examiner*—Lincoln Donovan
*Assistant Examiner*—Tyrone Smith
(74) *Attorney, Agent, or Firm*—Seed IP Law Group PLLC

(57) ABSTRACT

A method drives a synchronous electric motor, particularly to start a fan/exhaust fan. The method includes measuring the supply voltage value of the electric motor windings being proportional to the mass flow rate. The method also includes measuring a real load angle, by a signal coming from a Hall sensor associated with the motor rotor; performing a comparison with an optimal load angle corresponding to a reference mass flow rate of fluid being exhausted; and changing the voltage value and the operating frequency applied to the electric motor up to reach a value of the real load angle corresponding to said optimal load angle value.

14 Claims, 5 Drawing Sheets

METHOD FOR DRIVING A SYNCHRONOUS ELECTRIC MOTOR IN PARTICULAR FOR FANS

BACKGROUND OF THE INVENTION

1. Field of the Invention

The present invention relates, in its more general aspect, to a synchronous electric motor particularly, but not exclusively, used in smoke suction fans mounted in wall boilers.

In particular, the invention relates to a driving method of a synchronous electric motor comprising a rotor equipped with a permanent magnet, which is rotation-operated by the electromagnetic field generated by a stator being equipped with pole pieces and the relevant windings.

2. Description of the Related Art

As it is well known to the skilled in the art of this specific field, wall boilers are equipped with smoke extraction fans, commonly called exhaust fans, generally operated by asynchronous electric motors.

Fan models operated by synchronous electric motors have been only recently introduced.

Wall boilers generally comprise, besides a burner, a driving electronic box allowing the burner to be turned on and off, eventually by means of a timer, as well as the increase or decrease of the plant circulation water temperature to be regulated.

Smokes produced by the burner have different physical features according to the boiler operation speed and thus, in order to optimize the boiler operation, the fan should adjust the smoke suction to this operation speed.

In particular, when turning on, an initial thermal-transient step occurs, after which a steady-state step begins, which can be defined as a fixed-displacement state. During the initial step, the smokes being produced have a higher density and the fan should thus change the motor operating conditions by sucking more in order to extract smokes and allow the boiler to operate in the best way.

Obviously, the same thermal transient occurs if the plant temperature is changed.

It is thus typical to position in the plant, downstream the fan, a smoke flow rate regulation lock which, according to the boiler position and more particularly to the flue lodgement and flow resistance level, allows a constant-in-time smoke mass flow rate to be kept.

This lock undergoes, for a good operation, a constant and accurate maintenance without which a burner shutdown and/or an extremely dangerous toxic smoke saturation in the boiler room and eventually in adjacent rooms is threatened.

Too sharp changes of the load flow rate can also cause a temporary motor shutdown, which would require a sudden manual or automatic intervention for a new starting.

It is also convenient that the electric motor always operates at a speed approaching the highest efficiency speed, defined by an operation point corresponding to the lowest power absorbed by the line, also resulting in energy saving for the user.

In order to obtain a speed approaching the highest efficiency speed, it would be very useful to have a measure of the load, i.e., of the smoke flow rate, available any moment.

Different devices for measuring the flow rate, even through continuous surveys, are known in the prior art.

Generally, these flow meters are devices being positioned in correspondence with the fan deliveries and, by exploiting different principles, determining the gas volume flowing through a given section in a predetermined time, in particular a differential manostat can be for example provided, positioned between the fan suction and delivery.

All these meters, although satisfying the aim of providing a flow rate measure, thus have some drawbacks.

First of all, a certain area, wherein they must be housed, is to be provided on the delivery.

Moreover, it must be underlined that, in order to check the good operation thereof, these devices must undergo periodical precautionary maintenance activities.

Other solutions can provide the use of current sensors in order to indirectly determine the fan flow rate by sensing a higher or lower current absorption by the stator windings.

Nevertheless, this solution does not provide precise and reliable measures.

A further prior art solution is described in the European patent application no. 0 403 806 relating to a centrifugal pump or fan for letting a controlled-temperature fluid flow, particularly in heating systems. Sensors for determining the fluid flow rate and temperature sensors for determining the fluid temperature are provided. A control device being associated to the electric motor processes the values received by the sensors for the motor driving in order to obtain an almost constant fluid temperature.

Also this solution requires expensive sensors to be managed, complicating the structure of the fan and of the device for driving the relevant electric motor.

BRIEF SUMMARY OF THE INVENTION

One embodiment of the present invention provides a driving method of a synchronous electric motor, particularly for the fan operation, allowing all the drawbacks mentioned with reference to the prior art to be overcome in a simple and cheap way.

In particular, this driving method minimizes the power being absorbed at all motor operation speeds, solving possible critical load change situations which could stall the synchronous electric motor.

The driving method allows the mass flow rate of a synchronous electric motor to be kept constant when the load changes.

The features and advantages of the method according to the invention will be apparent from the following description of an embodiment thereof given by way of non limiting example with reference to the attached drawings.

DETAILED DESCRIPTION OF THE INVENTION

Figure 1:
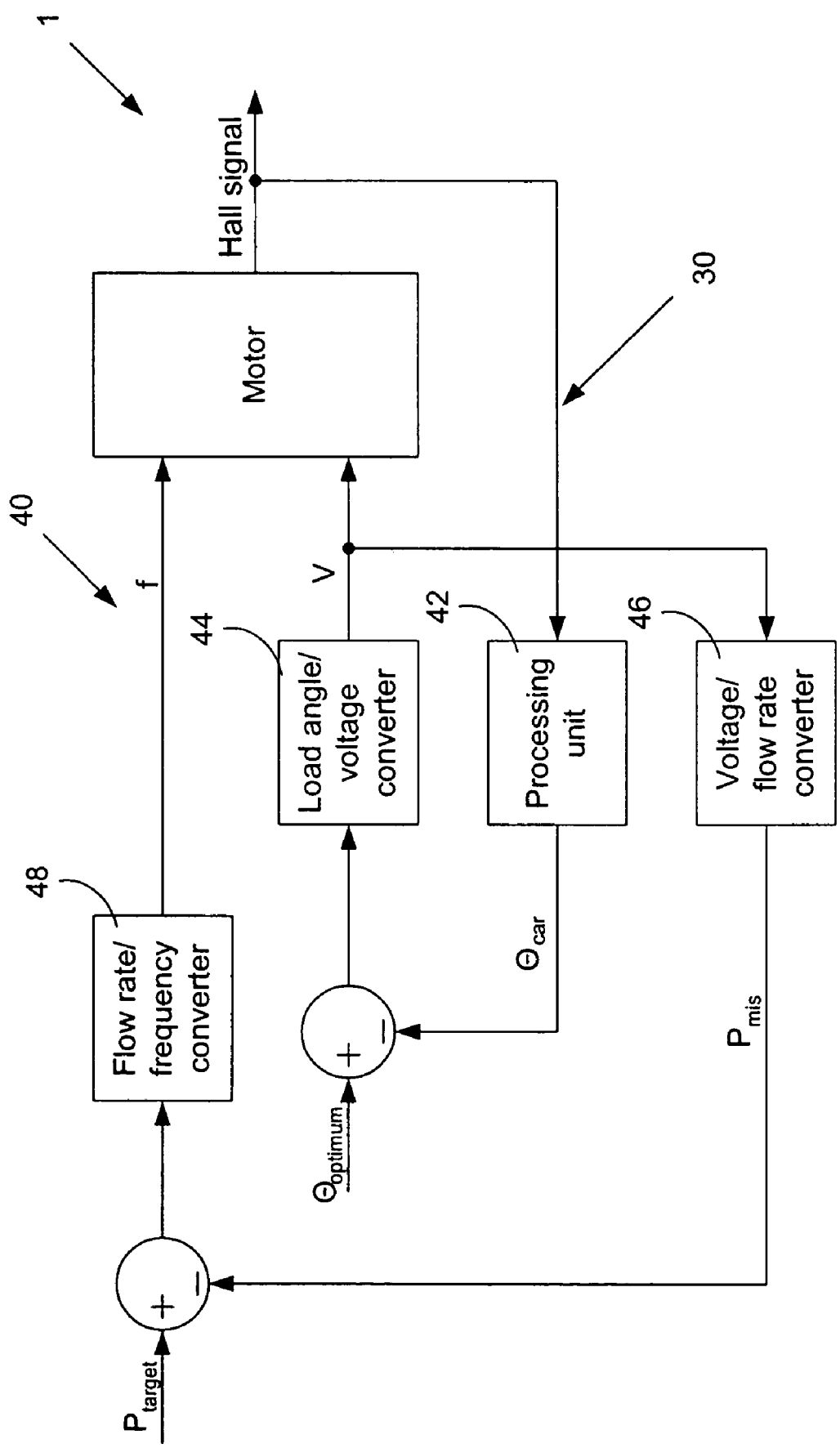
FIG. 1 is a block diagram of the principle of an algorithm for driving the method realized according to the present invention.
Figure 3:
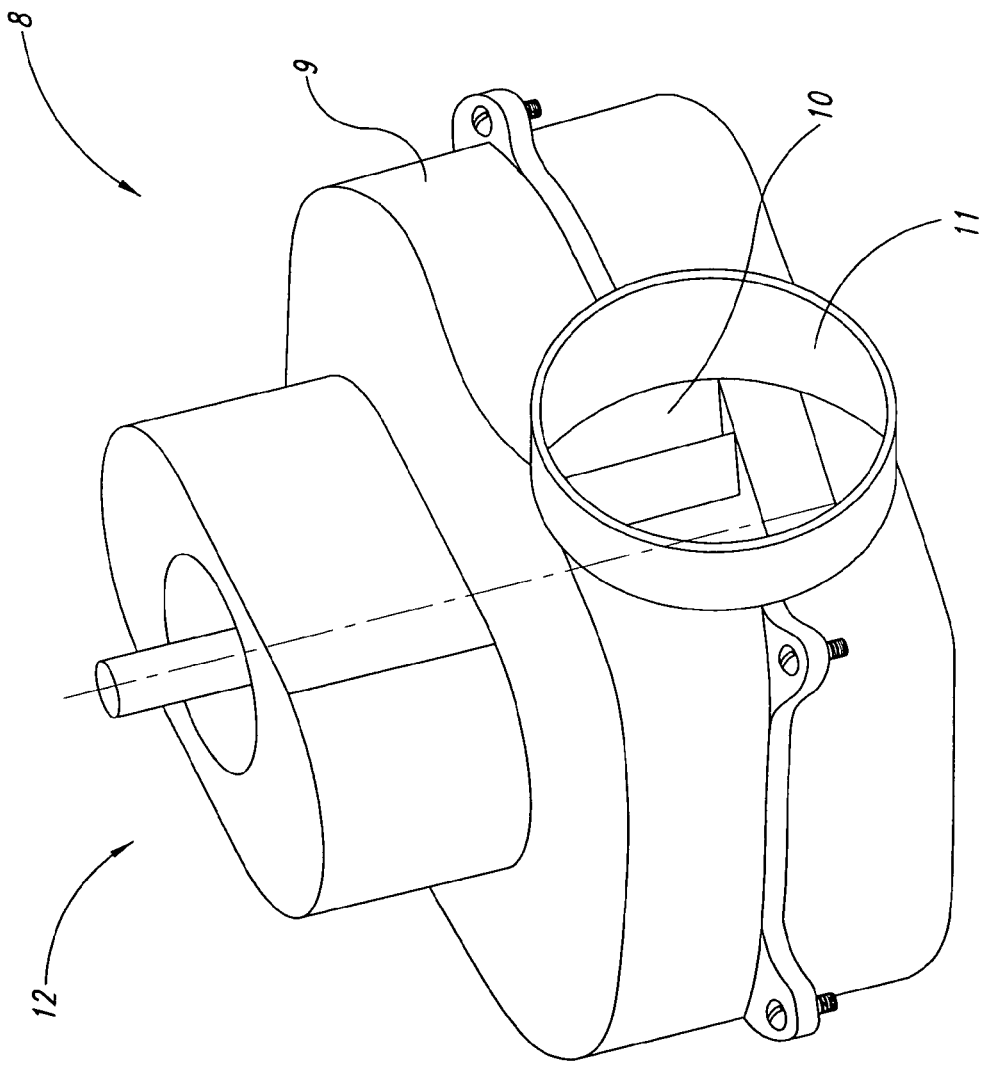
FIG. 3 shows an embodiment of a fan for a wall boiler using the method of the present invention.
Figure 4:
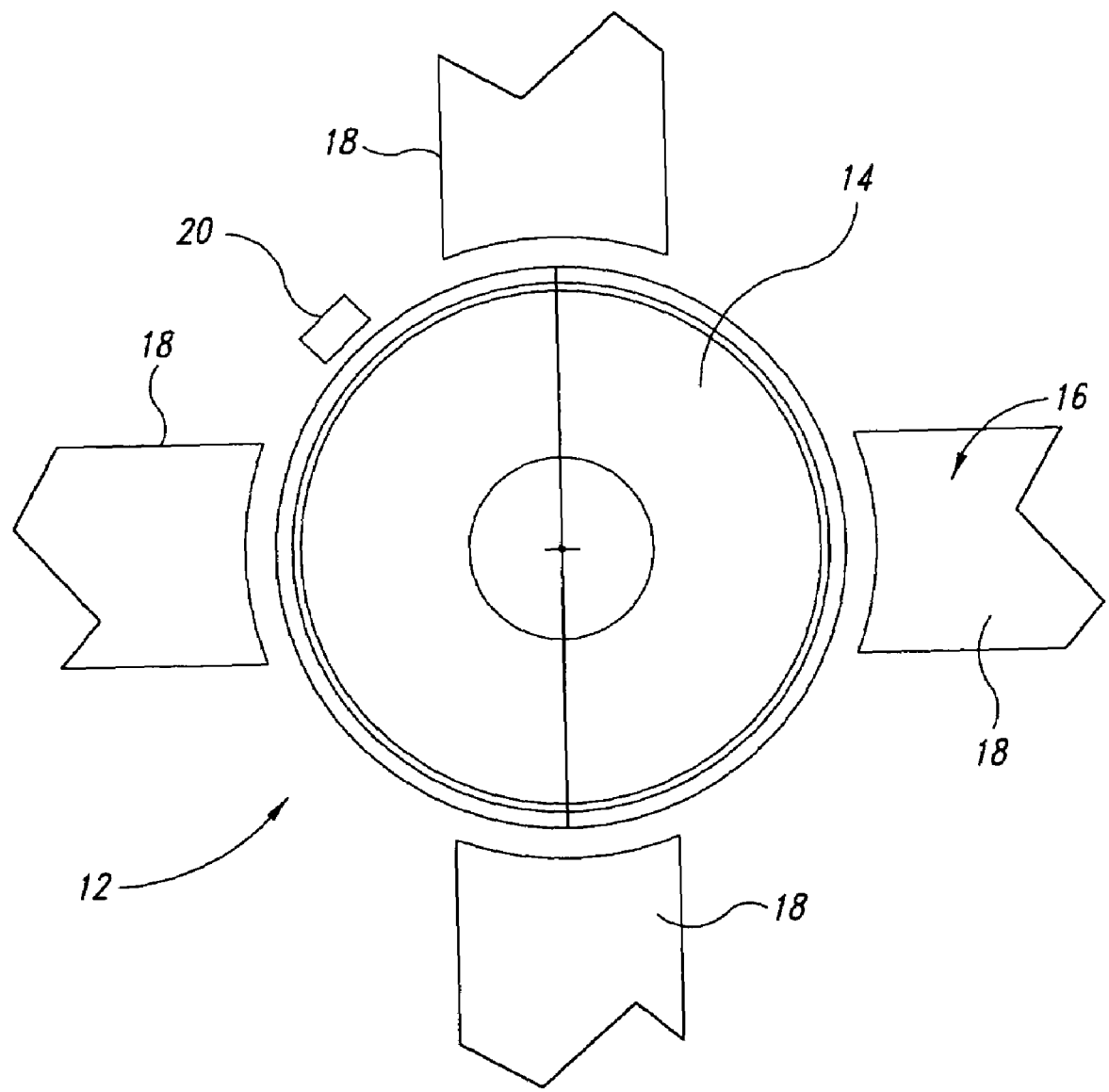
FIG. 4 schematically shows a synchronous electric motor for operating the fan of FIG. 3.

With particular reference to the example of FIG. 1, a block diagram of an algorithm processing principle is shown, whereon a driving method according to one embodiment of the present invention is based. This diagram is globally indicated with 1 and it is suitable to drive a synchronous electric motor 12, as shown in FIGS. 3 and 4, in particular to operate a fan 8.

The fan 8 has a body 9 for housing an impeller 10 coupled to an end of a rotor 14 of the motor 12, allowing the impeller 10 to rotate and thus smokes to be sucked by a suction duct in order to push them towards a delivery duct 11.

The synchronous motor 12 comprises the rotor 14, equipped with a permanent magnet which is rotated by the electromagnetic field generated by a stator 16, equipped with pole pieces 18 and the relevant windings.

Advantageously, the motor 12 comprises a magnetic flux sensor 20, for example a Hall sensor, particularly an analog sensor, positioned on the stator 16 close to the rotor 14. The sensor 20 outputs a signal defining the momentary position of the rotor 14.

As it is known, the signal of the sensor 20 is a signal phased with the counter electromotive force E in the absence of a constant. The phase angle between the counter electromotive force E and the network voltage V provides the load angle $\theta$ of the motor 12.

In the case of the fan 8, like in all aerial and/or hydraulic applications, the load angle $\theta$ is related to the mass flow rate of the flowing gas or fluid whose calculation formula is:

$$P\text{mass} = \delta * A * v$$

Where $\delta$ is the gas density, A is the delivery duct 11 area and v is the speed of the gas flowing through this delivery duct 11.

Therefore, the mass flow rate depends on the gas density, on the dynamic pressure thereof in convection and/or forced-circulation in the body 9 of the fan 8 and on the gas temperature.

A change of the features of the gas flowing through the body 9 of the fan 8 involves a change of the mass flow rate and thus of the load angle $\theta$ of the motor 12.

The synchronous motor 12 has for each load, and thus for each load angle $\theta$, an ideal operation point which will be called "optimum point", wherein the motor 12 absorbs the lowest quantity of current and it conveys the highest power to the load.

This situation can be represented by cusp curves having a well defined minimum being already identified by the prior art.

Letting the motor operate near the "optimum point" allows the highest efficiency to be obtained with the lowest losses.

Figure 5:
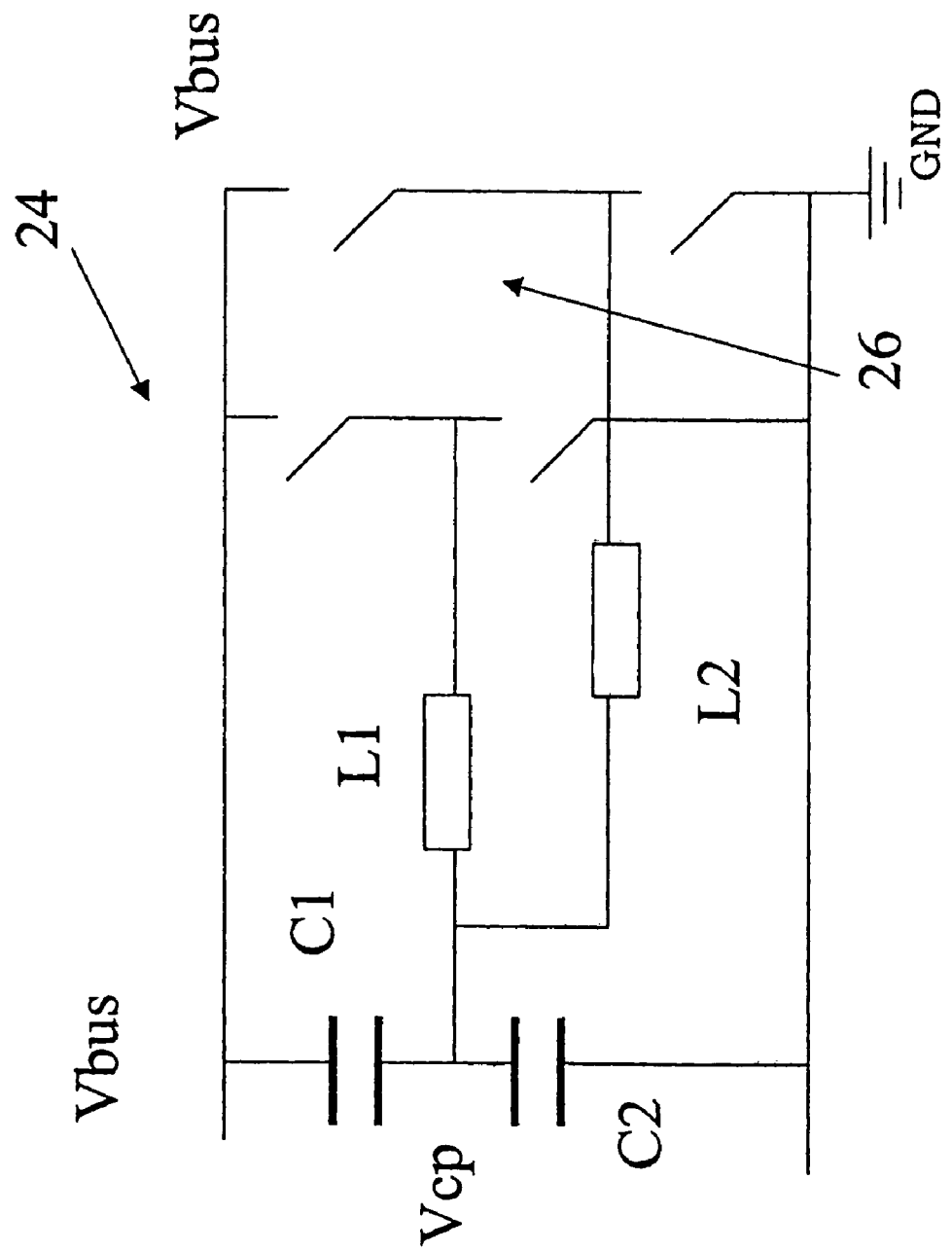
FIG. 5 shows a power regulation circuit being incorporated, according to the invention, in a synchronous electric motor driving circuit.

Concerning the synchronous motor 12 power supply, as shown in FIG. 5, a possible solution provides to rectify an alternate voltage provided by the network by means of a diode bridge followed by a capacitor stage, allowing the rectified voltage to be leveled. The so-obtained voltage is conveniently modulated by means of some switches (IGBT or power MOS . . . ), conveniently controlled according to a PWM modulation technique, which allows a voltage to be provided to the windings of the pole pieces 18, whose frequency and fundamental sinusoid amplitude can be varied.

The voltage of half the bridge would be $V_{BUS/2}$ if not being connected to the load. In fact the voltage at the bridge center varies around the value $V_{BUS/2}$ according to a sinusoid law with a ripple whose oscillation frequency is equal to the PWM frequency.

According to the method provided by the present solution, the operating conditions of the synchronous motor 12 are kept close to the "optimum point" by means of a first and second regulation loop 30, 40, schematically indicated in FIG. 1, both feedback operating.

Advantageously, the first loop 30, also defined as inner or faster loop, regulates the supply voltage provided to the windings of the pole pieces 18 and indicated with Vwindings, according to the load angle $\theta_{car}$ deviation from the optimum angle $\theta_{optimum}$.

The optimum angle $\theta_{optimum}$ is drawn from experimental measures, known in the prior art, and it is indicated in convenient tables. By operating according to the "optimum angle", the motor absorbs the lowest current according to the different loads or load powers.

The load angle $\theta_{car}$ of the synchronous motor 12 is steadily provided, based on the signal processing by a processing unit 42 of the signal provided by the Hall sensor 20.

In particular, the 90° complement of the load angle $\theta_{car}$ is measured and if it is higher than the optimum angle $\theta_{optimum}$, the voltage Vwindings is increased on windings L1 and L2, and vice versa by a load angle/voltage converter 44. Obviously, in order to regulate the voltage Vwindings, a frequency converter can be used, based on a boost converter microcontroller. FIG. 5 schematically shows a power circuit 24 with an active element bridge 26 which can be used to this purpose.

Advantageously, the second regulation loop 40, also defined as external slower loop, regulates the frequency f of the synchronous motor 12 according to the voltage Vwindings provided to the windings L1.L2 of the pole pieces 18, based on the first loop 30.

In particular, this second loop 40 allows the synchronous motor 12 to operate in steady conditions. As it is known in the prior art, the synchronous motor has for each load power a lower stability limit given by a lowest voltage provided to the motor according to a predetermined operating frequency.

Obviously, as above-underlined, the voltage Vwindings provided to the synchronous motor 12 is related to the fan mass flow rate $P_{mass}$ and proportional to this mass flow rate. A voltage/flow rate converter 46 produces a measured mass flow rate $P_{mis}$ from the voltage Vwindings.

Therefore, if the mass flow rate being measured ($P_{mis}$) according to the second loop 40 by the voltage Vwindings is lower than the optimum mass flow rate, indicated in FIG. 1 with $P_{target}$, then the operating frequency f of the synchronous motor 12 is increased and vice versa by a flow rate/frequency converter 48.

In particular, the reference mass flow rate $P_{target}$ is, in the case of the fan 8, the one ensuring an effective and safe combustion, i.e., obtained through a convenient concentration of burnt gases carbon monoxide, carbon dioxide and nitric oxides.

Concerning the method provided by the present solution on a fan 8 with synchronous motor 12, after an initial transient when the burner reaches a steady state, an optimum load angle $\theta_{optimum}$ having a mass flow rate $P_{target}$ prevails. Therefore a voltage value Vwindings to be provided to the windings L1, L2 of the pole pieces 18 of the motor 12 and an operating frequency value f of the motor 12 are defined by means of a frequency converter.

The voltage Vwindings is regulated according to the first loop 30 so that the load angle $\theta_{car}$ follows the optimum load angle $\theta_{optimum}$.

The second loop 40 will thus allow the frequency f of the synchronous motor 12 to be changed in order to keep the $P_{target}$ and avoid any instability of the motor 12.

Figure 2:
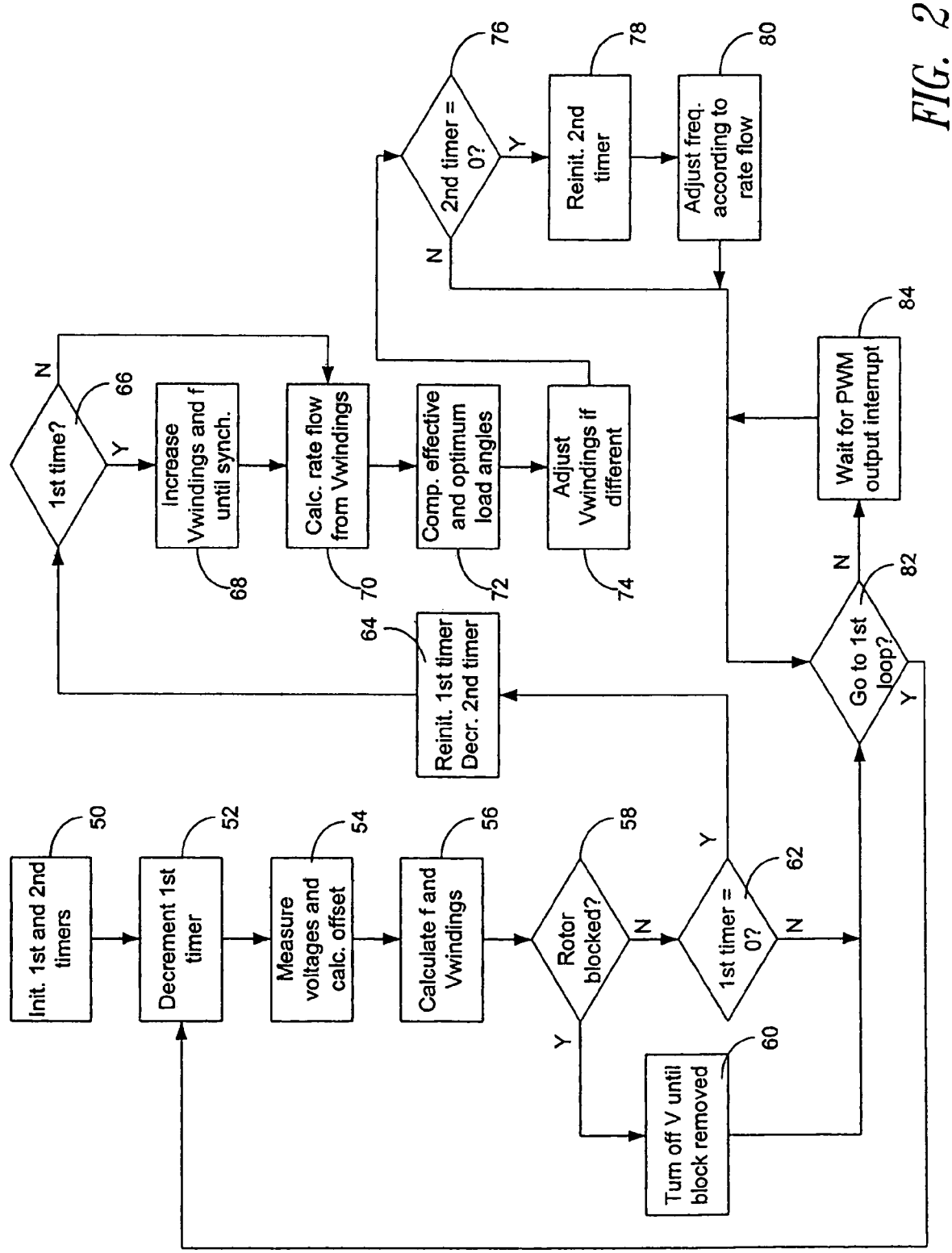
FIG. 2 is a general flow chart showing the steps of a method for driving a synchronous electric motor according to the present invention.

The driving method according to the present solution will be now analyzed in detail with reference to the flow chart indicated in FIG. 2, this embodiment is shown by way of non-limiting example.

First and second timers are set for the first or inner loop 30 and the second loop or outer loop 40, respectively (step 50).

The first timer is decremented during operation of the first loop (step 52).

The conveniently rectified and leveled network voltage is measured, for example by means of a diode bridge associated with convenient capacitances; $V_{BUS}$ and the center-bridge voltage $V_{cp}$ are then measured; and the offset voltage, i.e., the deviation of the center-bridge voltage $V_{cp}$ from $V_{BUS/2}$, is calculated (step 54).

The voltage to be applied to the pole pieces 18 and the operating frequency f are calculated for the motor 12 (step 56).

Advantageously, the method provides to set the optimum load angle $\theta_{optimum}$ and thus the reference mass flow rate $P_{target}$.

The rotor 14 is then analyzed and, by means of the signal of the Hall sensor 20, the real load angle $\theta_{car}$ is drawn.

It is checked if the rotor is locked (step 58) and, in such a case, the power supply to the windings is interrupted (step 60), otherwise a check is made to determine if first timer equals zero (step 62).

If so, then the method decrements the timer of the second loop 40 and to reset the timer of the first inner loop 30 (step 64).

Next, a check is performed to see if it is the first time executing the second loop (step 66).

If so, then the method increases the voltage and the frequency up to reach the network synchronism (step 68).

Next, the method calculates the mass flow rate Pmass starting from Vwindings (step 70).

The method further compares the effective load angle with the optimum load angle (step 72) and adjusts variable that affect Vwindings if the optimum load angle is not achieved (step 74).

A check is made to see if the second timer equals zero (step 76), and if so, the method:

resets the second timer (step 78); and.

adjusts the operating frequency f if the present mass flow rate differs from the set flow rate $P_{target}$ (step 80).

Advantageously, the method thus provides to compare the real angle $\theta_{car}$ with the optimum load angle $\theta_{ott}$ by changing Vwindings and the operating frequency f up to reach the optimum load value $\theta_{ott}$.

As it is evident from the above, the control method provides to keep the mass flow rate constant by changing the motor operating conditions by means of two feedback cycles; a first inner faster cycle 30 allowing the winding voltage to be changed and a second outer cycle 40 allowing the frequency f to be changed.

Advantageously, it can be observed how the frequency f change takes more time than the voltage Vwindings change and particularly when the winding voltage Vwindings is steady. Therefore the synchronous motor is avoided to operate under almost unsteady conditions wherein the motor could not succeed in following the supply voltage, risking a sudden interruption.

Advantageously, the above-described method allows to avoid, in the case of the fan, hood, smokes, during the initial burner transient, the load angle change from being considered as a change of the aeraulic load. In fact, when the burner is turned on, the temperature increases according to a given transient, by applying a control system as indicated in the European patent application no. 03425571.1 of the same Applicant this temperature change can be conveniently determined.

Obviously, the present method can have different alternative embodiments among which the case of the digital Hall sensor can be considered.

Moreover, the mass flow rate $P_{mass}$ being calculated could be provided as a signal for a convenient boiler control electronic box.

Advantageously, the control method being shown allows any device for measuring the flow rate to be eliminated, as well as the lock positioned in the fan delivery and the differential manostat positioned between the fan suction and delivery. In fact this method allows the smoke mass flow rate to be calculated and kept constant in time and an output signal being proportional to the mass flow rate to be provided, or simply an alarm signal when the mass flow rate is not sufficient. The boiler control electronic box will provide the extinction of the pilot flame in case of alarm or it will process a flow rate signal by modulating the gas pressure at the burner nozzles.

A further advantage of the suggested control method is the complete removal of the smoke flow rate regulation lock positioned downstream the fan, thus improving the fan operating conditions with respect to the emitted smokes and considerably reducing maintenance operations.

A further advantage of the suggested control method according to the present solution is the constant control of the smoke mass flow rate, allowing the combustion efficiency to be improved in the fan operation areas outside the target point, as for example during the boiler starting transient.

Another advantage of the suggested control method is to allow the smoke mass flow rate to be kept constant in time by changing the motor operating conditions.

Experimental tests carried out by the Applicant allowed to prove that the method according to the invention is particularly competitive from the economic viewpoint with respect to all the other techniques presently used in this field.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A control method of controlling a synchronous electric motor of a fan, the method comprising:

providing a reference mass flow rate of a gas or fluid being exhausted in the fan and a corresponding optimal load angle of a rotor of the motor;

measuring a real load angle, by a signal coming from a Hall sensor associated with the rotor of the motor;

comparing the real load angle with the optimal load angle;

applying, in response to comparing the real load angle with the optimal load angle, a change in a supply voltage value applied to windings of the motor to change the real load angle toward said optimal load angle;

determining a mass flow rate based on the changed supply voltage value applied to windings of the motor;

comparing the determined mass flow rate to the reference mass flow rate; and changing an operating frequency of the motor based on the comparing of the determined mass flow rate to the reference mass flow rate.

2. A method according to claim 1, wherein said frequency change takes more time than the voltage change.

3. A method according to claim 1, wherein said frequency change occurs when the winding voltage is steady.

4. A method according to claim 1, further comprising interrupting the motor power supply when a rotor shutdown is detected.

5. A control method of controlling a synchronous electric motor of a fan, the motor including a rotor, motor windings, and a Hall sensor, the method comprising:

providing a reference mass flow rate of a gas or fluid being exhausted by the fan and corresponding to an optimal load angle of the rotor;

measuring a real load angle through a signal coming from the motor;

comparing the real load angle with the optimal load angle;

applying a feedback change in a supply voltage value applied to the windings;

determining a real mass flow rate by measuring the supply voltage value applied to the windings;

comparing the real mass flow rate to the reference mass flow rate; and applying a feedback change in an operating frequency of the motor.

6. A method according to claim 5, wherein said frequency change takes more time than the voltage change.

7. A method according to claim 5, wherein said frequency change occurs when the winding voltage is steady.

8. A method according to claim 5, further comprising interrupting the motor power supply when a rotor shutdown is detected.

9. A control method of controlling a synchronous electric motor of a fan, the method comprising:

providing an reference load angle of a rotor of the motor;

measuring a real load angle of the motor;

comparing the real load angle with the reference load angle;

changing, in response to comparing the real load angle with the reference load angle, a supply voltage value applied to windings of the motor to change the real load angle toward said reference load angle value; and changing an operating frequency of the motor based on the changed supply voltage value.

10. A method according to claim 9, wherein changing the operating frequency includes:

determining a mass flow rate based on the changed supply voltage value applied to windings of the motor;

comparing the determined mass flow rate to a reference mass flow rate; and changing the operating frequency of the motor based on the comparing of the determined mass flow rate to the reference mass flow rate.

11. A method according to claim 9, wherein said frequency change takes more time than the voltage change.

12. A method according to claim 9, wherein said frequency change occurs when the winding voltage is steady.

13. A method according to claim 9, further comprising interrupting the motor power supply when a rotor shutdown is detected.

14. A method according to claim 9, wherein measuring the real load angle includes using a Hall sensor to measure the real load angle.

* * * * *